(12) United States Patent
Sutton et al.

(10) Patent No.: US 7,895,816 B2
(45) Date of Patent: Mar. 1, 2011

(54) THRESHED MATERIAL COLLECTING AND DUMPING APPARATUS FOR A COMBINE

(76) Inventors: James Sutton, Calgary (CA); Allan James, Balzac (CA)

( * ) Notice: Subject to any disclaimer, the term of this patent is extended or adjusted under 35 U.S.C. 154(b) by 85 days.

(21) Appl. No.: 12/255,114

(22) Filed: Oct. 21, 2008

(65) Prior Publication Data

US 2010/0095647 A1 Apr. 22, 2010

(51) Int. Cl.
*A01D 75/00* (2006.01)
(52) U.S. Cl. .......................... 56/473.5; 56/476; 56/480
(58) Field of Classification Search .............. 56/473.5, 56/474–480; 414/482–487
See application file for complete search history.

(56) References Cited

U.S. PATENT DOCUMENTS

| | | | |
|---|---|---|---|
| 544,803 A | 8/1895 | Wilde | |
| 2,152,644 A * | 4/1939 | Hiser | ............................ 298/5 |
| 2,484,949 A * | 10/1949 | Jacobs | ....................... 56/473.5 |
| 2,774,209 A * | 12/1956 | Bauer | ........................... 56/122 |
| 3,092,272 A * | 6/1963 | Weigel | ........................ 414/482 |
| 3,126,069 A * | 3/1964 | Shepley | ...................... 177/136 |
| 3,567,072 A | 3/1971 | Tenhulzen | |
| 3,584,448 A | 6/1971 | Martinmaas | |
| 3,599,844 A | 8/1971 | Dickson | |
| 3,941,420 A * | 3/1976 | Klasna | ......................... 298/26 |
| 4,027,809 A * | 6/1977 | Gerber | ....................... 414/437 |
| 4,295,772 A * | 10/1981 | Zimmerman | ............. 414/789.2 |

* cited by examiner

*Primary Examiner*—Alicia M Torres
(74) *Attorney, Agent, or Firm*—Maxey Law Offices, PLLC; Stephen Lewellyn

(57) ABSTRACT

An apparatus for combines for the collection of threshed material discharged from the combine and automatically dumping the collected material when a predetermined weight of material is accumulated. The apparatus includes a threshed material collector attached to the combine for rotation about a horizontal axis that is closer to a forward end of the collector than a rearward end of the collector. The collector includes a plurality of horizontally spaced tines extending in a rearward direction and position to collect material discharged from the combine. A counter weight is attached to the collector for controlling the amount of material collected before the collector rotates under the weight of the collected material to a dumping position where the collected material is removed from the collector.

3 Claims, 2 Drawing Sheets

THRESHED MATERIAL COLLECTING AND DUMPING APPARATUS FOR A COMBINE

FIELD OF THE INVENTION

The present invention relates generally to the bunching or piling of threshed material discharged from a combine, and more particularly, relating to a threshed material collecting and dumping apparatus for attachment to a combine which collects discharged material and automatically dumps the material when a sufficient amount has been collected.

BACKGROUND OF THE INVENTION

Ordinarily, combines or the like include a straw or threshed material spreader apparatus at the rearward end thereof to spread the threshed material over a wide area as it is being discharged from the combine. In recent years, it has been found that it is desirable to collect the threshed material in piles or the like so that the threshed material can be collected and fed to livestock. Many dumping apparatuses have been substituted for the straw spreader apparatuses and ordinarily involve elaborate structure which is difficult to install and which is costly.

Accordingly, there is a need for an improved threshed material collecting and dumping apparatus for attachment to a combine which collects discharged material and automatically dumps the material when a sufficient amount has been collected.

SUMMARY OF THE INVENTION

In general, in one aspect, a threshed material bunching and dumping apparatus for a combine vehicle having a threshed material discharge opening is provided. The apparatus includes a mounting frame having a pair of laterally spaced support arms defining an open space therebetween. The support arms being horizontally disposed. A threshed material collector disposed within the open space. The threshed material collector having rearward and forward ends, an elongated support having opposed ends, and a plurality of tines horizontally spaced along and secured to the elongated support and extending rearwardly therefrom. The elongated support extending laterally across the forward end between the support arms within the open space. The threshed material collector being pivotally attached to the support arms for rotation about a horizontal axis between a normal horizontally disposed position to a dumping position. The horizontal axis being located closer towards the forward end than the rearward end. A counter weight support attached to the forward end and extending forwardly therefrom. A counter weight attached to the counter weight support and positionable along the counter weight support from a first location closest to the forward end and a second location farthest from the forward end. An attachment means for fixedly attaching the mounting frame to a combine vehicle with the support arms extending in a rearwardly direction from the combine vehicle and with the threshed material collector disposed adjacent a threshed material discharge opening of the combine vehicle for collecting threshed material discharged therefrom, whereby discharged threshed material is collected by the threshed material collector and dumped therefrom once a predetermined amount by weight of threshed material is collected. Each support arm of the pair of support arms can be telescopic in length.

In general, in another aspect, a threshed material bunching and dumping apparatus for a combine vehicle having a threshed material discharge opening is provided. The apparatus includes a mounting frame having a pair of laterally spaced support arms defining an open space therebetween. The support arms being horizontally disposed, and each having a forward and rearward end. A threshed material collector disposed within the open space. The collector having a collector frame with forward and rearward ends, and an elongated support having opposed ends. The elongated support extending laterally across the forward end between the support arms within the open space. The collector frame further having a first fulcrum arm extending rearwardly from the a first end of the elongated support, a second fulcrum arm extending rearwardly from the first end of the elongated support, and a plurality of tines horizontally spaced along and secured to the elongated support and extending rearwardly therefrom. The threshed material collector being pivotally attached to the support arms by a pivotal coupling between the support arms and the first and second fulcrum arms for rotation about a horizontal axis between a normal horizontally disposed position to a dumping position. The horizontal axis being located closer towards the forward end than the rearward end. A first counter weight support attached to the elongated support and extending forwardly therefrom. A first counter weight attached to the first counter weight support and positionable along the counter weight support from a first location closest to the forward end and a second location farthest from the forward end. A second counter weight support attached to the elongated support and extending forwardly therefrom. A second counter weight attached to the second counter weight support and positionable along the counter weight support from a first location closest to the forward end and a second location farthest from the forward end. An attachment means for fixedly attaching the mounting frame to a combine vehicle with the support arms extending in a rearwardly direction from the combine vehicle and with the threshed material collector disposed adjacent a threshed material discharge opening of the combine vehicle for collecting threshed material discharged therefrom, whereby discharged threshed material is collected by the threshed material collector and dumped therefrom once a predetermined amount by weight of threshed material is collected. Each support arm of the pair of support arms can be telescopic in length. The plurality of tines can extend rearwardly beyond the rearward ends of the pair of support arms.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
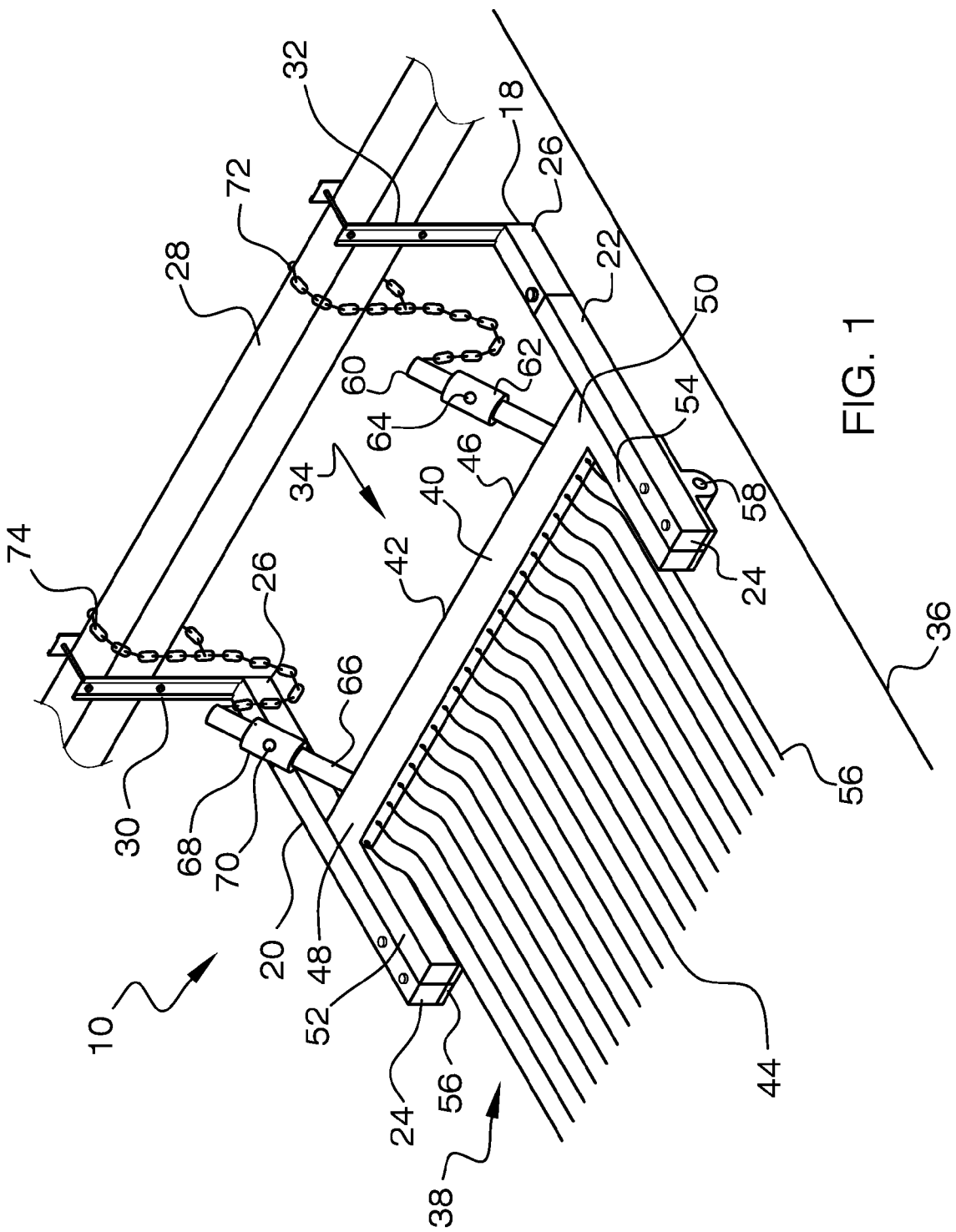
FIG. 1 is a diagrammatic perspective view of the threshed material collecting and dumping apparatus constructed in accordance with the principles of the present invention and installed on an axle of a combine.
Figure 2:
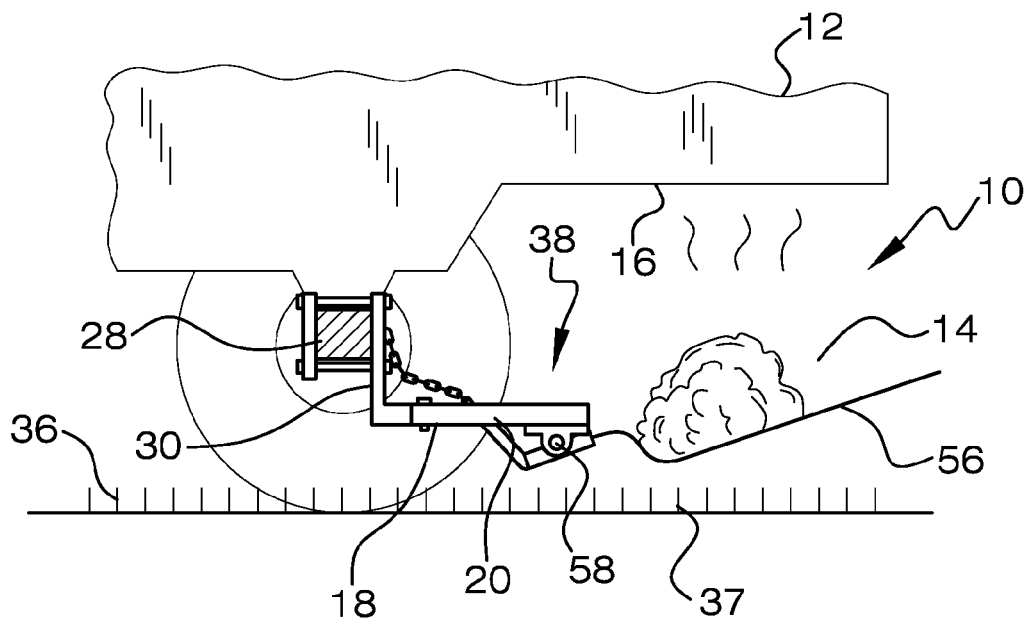
FIG. 2 is a side elevation view of the threshed material collecting and dumping apparatus shown in an initial position collecting threshed material discharged from the combine to which it is attached.
Figure 3:
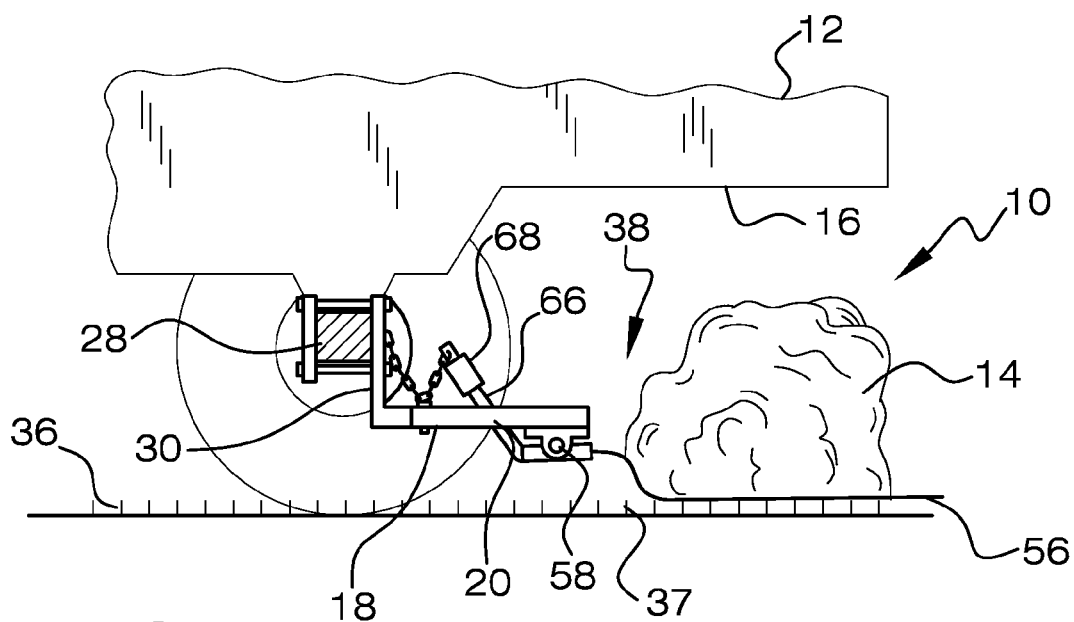
FIG. 3 is a side elevation view of the threshed material collecting and dumping apparatus shown in dumping position and dumping a pile of collected threshed material on the ground as the combine moves forward.

There is shown in FIGS. 1-3, a threshed material bunching and dumping apparatus 10 according to the present invention. The apparatus 10 is mountable on the rearward end of a combine 12 for collecting threshed material 14 discharged from a discharge opening 16 in the combine. The apparatus 10 operates to collect the material 14 until a predetermined weight of material is collected, and then automatically unloads or dumps the material on the ground as the combine moves forward. In this manner, bunches or piles of material are automatically placed on the ground at spaced intervals as the combine moves across a crop field. This process is completed automatically and requires no attention from the combine operator.

The apparatus 10 includes a frame 18 having a pair of laterally spaced support arms 20 and 22 defining an open space 34 therebetween. Each support arm 20 and 22 has a rearward end 24 and forward end 26. The forward end 26 of each support arm 20 and 22 is fixedly attached to an axle 28 of the combine 12 by vertical brackets 30 and 32 respectively, and extend in a rearwardly direction therefrom beneath the discharge opening 16. The support arms 20 and 22 are generally horizontally disposed and are supported in a cantilever fashion to the axle 28. The vertical brackets 30 and 32 permit the vertical adjustment of the support arms 20 and 22 relative to both the ground surface 36 and the discharge opening 16. The vertical brackets 30 and 32 also permit horizontal adjustment left-to-right across the axle 28. Each support arm 20 and 22 can be telescopic in length to permit horizontal adjustment front-to-rear relative to the discharge opening 16. The adjustability of the frame 18 permits the apparatus 10 to be installed and positioned on various different combine models to collect threshed material therefrom.

A threshed material collector 38 is disposed within the open space 34 between the support arms 20 and 22. The collector 38 has a collector frame 40 with forward and rearward ends 42 and 44. An elongated support 46 has opposed ends 48 and 50, and extends laterally across the forward end 42 between the support arms 20 and 22 within the open space 34. A first fulcrum arm 52 extends rearwardly from the first end 48 of the elongated support 46, a second fulcrum arm 54 extends rearwardly from the second end 50 of the elongated support. The threshed material collector 38 is pivotally attached to support arms 20 and 22 by a pivotal coupling 57 and 58 between support arms 20 and 22 and the first and second fulcrum arms 52 and 54 respectively for rotation about a horizontal axis A between a normal horizontally disposed position (FIGS. 1 and 2) to a dumping position (FIG. 3). The horizontal axis A being located closer towards the forward end 40 than the rearward end 42 of the collector 38.

A plurality of tines 56 are horizontally spaced along and secured to the elongated support 46 and extend rearwardly therefrom beyond the rearward end 24 of each support arm 20 and 22. The tines 56 are positioned below the discharge opening 16, and collect material 14 as it is discharged. The tines 56 can be spring arms which are yieldable into a temporary bent configuration when the collector 38 is rotated into a dumping position by the ground surface 36 (FIG. 3).

A first counter weight support 60 is fixedly attached to the elongated support 46 approximate end 48 thereof and extends forwardly therefrom at an upward angle relative to the horizontal. A first counter weight 62 is attached to the first counter weight support 60 and is positionable therealong from a first location closest to the forward end 42 and a second location farthest from the forward end. A pin 64 can be received by cooperating holes through the counter weight 62 and support 60 for securing the counter weight in position along the length of the support. A second counter weight support 66 is fixedly attached to the elongated support 46 approximate end 50 thereof, and extends forwardly therefrom at an upward angle relative to the horizontal. A second counter weight 68 is attached to the second counter weight support 66 and is positionable therealong from a first location closest to the forward end 42 and a second location farthest from the forward end. A pin 70 can be received by cooperating holes through the counter weight 68 and support 66 for securing the counter weight in position along the length of the support. The first and second counter weights 62 and 68 can be moved along their respective supports 60 and 66 to adjust the weight of collected material the collector 38 will dump at. Moving the weights 62 and 68 toward to the forward end 42 lowers the weight required, and moving the weights away from the forward end 42 increases the weight required.

Tethers 72 and 74 can be attached to the weight supports 60 and 66 and the axle 28 or another structure of the combine 12 to limit the rotation of the collector 38 to prevent over stressing the tines 56 against the ground and to prevent the collector from dragging against the ground.

The normal method of operation is as follows. The frame 18 is attached to the axle 28 of a combine 12 and adjusted such that the collector 38 is positioned below a threshed material discharge opening 16, and is approximately between six and nine inches above the ground surface. Once the frame 18 is attached, the remaining components of the apparatus 10 are assembled together on the combine. Once secured to the combine, the tines 52 of the collector 38 are disposed substantially horizontal and ready to collect discharged threshed material. A test weight may be placed on the tines 52 to permit adjustment of the counter weights 62 and 68 to the desired weight of collected material for dumping. As the combine 12 moves through the crop field, the threshed material 14 is discharged through the discharge opening 16 onto the tines 52 of the collector 38. When a sufficient material has accumulated on the tines 52 to overcome the counter weights 62 and 68, the collector 38 rotates about the horizontal axis of rotation A, which causes the tines 52 and the collected material to run along the ground 36. The friction between the ground 36, stubble 76 from the cut crop, and the collected material causes the material to be pulled from the tines 52 leaving a pile on the ground. Once the collected material has been dumped, the collector 38 returns to the collecting position with the tines 56 positioned to collect another pile or bunch of threshed material discharged from the combine. This process repeats continuously as the combine travels the field being harvested.

A number of embodiments of the present invention have been described. Nevertheless, it will be understood that various modifications may be made without departing from the spirit and scope of the invention. Accordingly, other embodiments are within the scope of the following claims.

What is claimed is:

1. The combination of a combine vehicle having a threshed material discharge opening and a threshed material bunching and dumping apparatus, comprising:
    a frame having laterally spaced first and second cantilever support arms defining an open space therebetween, each of said first and second cantilever support arms having a first end attached to an axle of said combine vehicle and extending substantially horizontally from said axle in a rearwardly direction therefrom and terminating at a second free end;
    a threshed material collector disposed within said open space, said threshed material collector having a collector frame with forward and rearward ends, and an elongated support having opposed first and second ends, said elongated support extending laterally across said forward end of said collector frame between said support arms and within said open space, a first fulcrum arm disposed within said open space and extending in a rearwardly direction from said first end of said elongated support and terminating at a free end, a second fulcrum arm disposed within said open space and extending in a rearwardly direction from said second end of said elongated support and terminating a free end, and a plurality of yieldable tines horizontally spaced along and secured to said elongated support and extending in a rearwardly direction therefrom,
    said first fulcrum arm pivotally attached to said first support arm about a horizontal axis and said second fulcrum arm pivotally attached to said second support arm about said horizontal axis so that said threshed material collector may pivot between a normal threshed material collecting position to a dumping position;
    a counter weight support attached to said forward end of said collector frame and extending forwardly therefrom;
    a counter weight attached to said counter weight support and positionable along said counter weight support from a first location closest to said forward end and a second location farthest from said forward end; and
    said tines disposed adjacent said threshed material discharge opening and collecting threshed material discharged therefrom, said threshed material collector pivoting from said collecting position to said dumping position when a predetermined weight of threshed material is collected by said tines, said tines are engaged with a ground surface when said threshed material collector is positioned in said dumping position and said collected threshed material is removed from said tines by contact with said ground surface as said combine travels in a forwardly direction across said ground surface.

2. The combination of claim 1, wherein said first fulcrum arm is contiguous with said elongated support and said second fulcrum arm is contiguous with said elongated support.

3. The combination of claim 2, wherein said tines extend from said elongated support along the length of each of said first and said second fulcrum arms and terminate beyond the free ends thereof.

* * * * *